(12) United States Patent
Chou et al.

(10) Patent No.: US 11,828,278 B2
(45) Date of Patent: *Nov. 28, 2023

(54) AIR COMPRESSOR

(71) Applicants: Wen-San Chou, Tainan (TW);
Cheng-Hsien Chou, Tainan (TW)

(72) Inventors: Wen-San Chou, Tainan (TW);
Cheng-Hsien Chou, Tainan (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/708,897

(22) Filed: Mar. 30, 2022

(65) Prior Publication Data

US 2022/0333590 A1    Oct. 20, 2022

(30) Foreign Application Priority Data

Apr. 16, 2021 (TW) .................................. 110113841

(51) Int. Cl.
*F04B 39/14* (2006.01)
*F04B 35/04* (2006.01)
(Continued)

(52) U.S. Cl.
CPC .............. *F04B 39/14* (2013.01); *F04B 35/04* (2013.01); *F04B 39/0016* (2013.01);
(Continued)

(58) Field of Classification Search
CPC ........................... F04B 39/0016; F04B 53/105; F04B 53/1062; F04B 53/1085; F04B 53/12; F04B 53/123; F16K 15/16; F16K 15/162

See application file for complete search history.

(56) References Cited

U.S. PATENT DOCUMENTS 1,578,880 A * 3/1926 De Luiz .............. F04B 39/1073
417/551
2,000,883 A 5/1935 Cullen et al.
(Continued)

FOREIGN PATENT DOCUMENTS

CN        101240785     8/2008
JP        H0791376      4/1995
(Continued)

OTHER PUBLICATIONS

"Search Report of Europe Counterpart Application", dated Aug. 19, 2022, p. 1-p. 7.
(Continued)

*Primary Examiner* — Christopher S Bobish
(74) *Attorney, Agent, or Firm* — JCIPRNET (57) ABSTRACT

An air compressor contains a piston actuated by a motor to move in a cylinder. The piston includes an air stop sheet mounted on a top support plate thereof. The air stop sheet includes a bending section having a positioning zone and an acting zone located opposite to the positioning zone and configured to cover an air channel of the piston. The bending section is a boundary axis of the acting area and the positioning zone of the air stop sheet so that a top of the air stop sheet facing the cylinder forms an obtuse angle less than 180 degrees, and a back surface of the acting zone of the air stop sheet backing a top of the cylinder turns on relative to a plane of a top of the top support plate at an open angle θ, thus producing an air flowing space.

4 Claims, 12 Drawing Sheets

(51) Int. Cl.
*F04B 39/00* (2006.01)
*F04B 53/12* (2006.01)
*F04B 53/10* (2006.01)
*F16K 15/16* (2006.01)

(52) U.S. Cl.
CPC ........ *F04B 53/105* (2013.01); *F04B 53/1062* (2013.01); *F04B 53/1085* (2013.01); *F04B 53/12* (2013.01); *F04B 53/123* (2013.01); *F16K 15/16* (2013.01); *F16K 15/162* (2021.08)

(56) References Cited

U.S. PATENT DOCUMENTS

| | | | | |
|---|---|---|---|---|
| 2,001,885 | A * | 5/1935 | Ohmart | F16K 15/16 417/571 |
| 2,217,380 | A * | 10/1940 | Longenecker | F16K 15/16 137/855 |
| 3,175,758 | A * | 3/1965 | Dirk | F04B 27/005 417/415 |
| 4,628,963 | A * | 12/1986 | Ishijima | F16K 15/162 137/857 |
| 4,642,037 | A * | 2/1987 | Fritchman | F04B 39/1073 137/856 |
| 5,601,118 | A * | 2/1997 | Jang | F04C 29/128 137/856 |
| 5,609,476 | A * | 3/1997 | Kim | F04B 39/1073 417/447 |
| 6,468,060 | B1 * | 10/2002 | Dormer | F04B 39/1073 137/856 |
| 6,565,336 | B1 * | 5/2003 | Fraser | F04B 39/1073 137/856 |
| 6,634,867 | B2 | 10/2003 | Pressel | |
| 6,823,891 | B2 * | 11/2004 | Schulze | F16K 15/16 137/512 |
| 7,311,119 | B2 * | 12/2007 | Takehana | F04B 53/105 137/856 |
| 7,493,915 | B2 * | 2/2009 | Lee | F16K 15/16 137/856 |
| 9,964,107 | B2 * | 5/2018 | Sadakata | F04B 53/1047 |
| 2004/0115075 | A1 * | 6/2004 | Chen | F04B 35/04 417/415 |
| 2005/0047947 | A1 * | 3/2005 | McCombs | F04B 39/1073 417/551 |
| 2007/0264140 | A1 * | 11/2007 | Chou | F04B 39/0016 417/415 |
| 2011/0076164 | A1 * | 3/2011 | Chou | F04B 53/12 417/550 |
| 2014/0261786 | A1 * | 9/2014 | Burau | A62C 3/08 137/505 |
| 2015/0377227 | A1 * | 12/2015 | Muhle | F04B 39/0005 417/545 |
| 2022/0307493 | A1 * | 9/2022 | Beasley | F04B 53/1042 |

FOREIGN PATENT DOCUMENTS

| | | |
|---|---|---|
| JP | 2009115044 | 5/2009 |
| JP | 2012251455 | 12/2012 |
| JP | 3237819 | 6/2022 |

OTHER PUBLICATIONS

"Office Action of Japan Counterpart Application", dated May 9, 2023, p. 1-p. 7.
"Office Action of Europe Counterpart Application", dated Aug. 23, 2023, p. 1-p. 4.

* cited by examiner

AIR COMPRESSOR

FIELD OF THE INVENTION

The present invention relates to an air compressor, and more particularly to the air compressor which includes a piston moving upward and downward in a cylinder of the air compressor.

BACKGROUND OF THE INVENTION

A conventional air compressor contains: a motor, a piston driven by the motor to move reciprocately in a cylinder, such that airs are compressed to produce compressed airs, and the compressed airs are delivered to a storage holder from the cylinder, thereafter the compressed airs are inflated into a deflated object via an output tube of the storage holder via a delivery hose connected with the output tube. The piston includes a conduit communicating with a head thereof, an air stop sheet covered on the conduit of a plane of a top of the piston. When the air compressor stops, the air stop sheet closes the conduit of the head of the piston. After the air compressor operates again, airtightness produces among an airtight ring and the air stop sheet of the head of the piston and the air stop sheet, so the compressed airs cannot be discharged out of the cylinder completely. After starting the air compressor once more, the piston hit the compressed airs in the cylinder to increase loading and electric currents of the air compressor, thus reducing a service life of the air compressor.

The present invention has arisen to mitigate and/or obviate the afore-described disadvantages.

SUMMARY OF THE INVENTION

The primary aspect of the present invention is to provide an air compressor by which a piston of the air compressor moves in a cylinder smoothly to enhance using safety and service life and to inflate airs into a deflated object easily.

To obtain above-mentioned aspect, an air compressor provided by the present invention contains: a piston which is actuated by a motor to move upward and downward in a cylinder.

The piston of the air compressor includes an air stop sheet mounted on a top support plate thereof, and the air stop sheet has a bending section. The bending section has a positioning zone arranged on the top support plate, and the bending section further has an acting zone located opposite to the positioning zone and configured to cover an air channel of the piston.

The bending section is a boundary axis of the acting area and the positioning zone of the air stop sheet so that a top of the air stop sheet facing the cylinder forms an obtuse angle less than 180 degrees, and a back surface of the acting zone of the air stop sheet backing a top of the cylinder turns on relative to a plane of a top of the top support plate at an open angle θ, thus producing an air flowing space.

Thereby, when the piston of the air compressor stops, the acting zone of the air stop sheet turns on relative to the air channel and the conduit so that a pressure of the cylinder balances with an atmosphere, and the piston is not stopped by an additional resistance (i.e. a back-pressure resistance) in the upward moving stroke after the air compressor is opened again, and the piston moves in the cylinder smoothly to enhance using safety and service life and to inflate the compressed airs into the deflated object easily.

Preferably, the positioning zone of the air stop sheet has two spaced orifices configured to accommodate the two separated bolts of the top support plate includes two separated bolts. The acting zone of the air stop sheet has a passing orifice, and the top support plate has a hook configured to engage with the passing orifice. A height of the hook is determined based on the output power of the air compressor, and when the piston moves in an upward stroke, the acting zone of the air stop sheet contacts with the plane of the top of the top support plate so that the air stop sheet closes the air channel. When the piston moves in a downward moving stroke, the air stop sheet is pushed by external airs to expand but is limited by the horizontal post of the hook, thus avoiding fatigue of the air stop sheet.

When the piston stops, the open angle and an air flowing space produces between the acting zone of the air stop sheet and the plane of the top of the top support plate, and the passing orifice of the air stop sheet is stopped by the horizontal post of the hook.

Preferably, the bending section includes a first collapsible guide line and a second collapsible guide line formed thereon, the acting zone has a passing orifice, the top support plate has a hook configured to engage with the passing orifice, when the air compressor stops, the acting zone of the air stop sheet turns on relative to the plane of the top of the top support plate, and a passing orifice of the air stop sheet is stopped by of the hook.

DETAILED DESCRIPTION OF THE PREFERRED EMBODIMENTS

Figure 1:
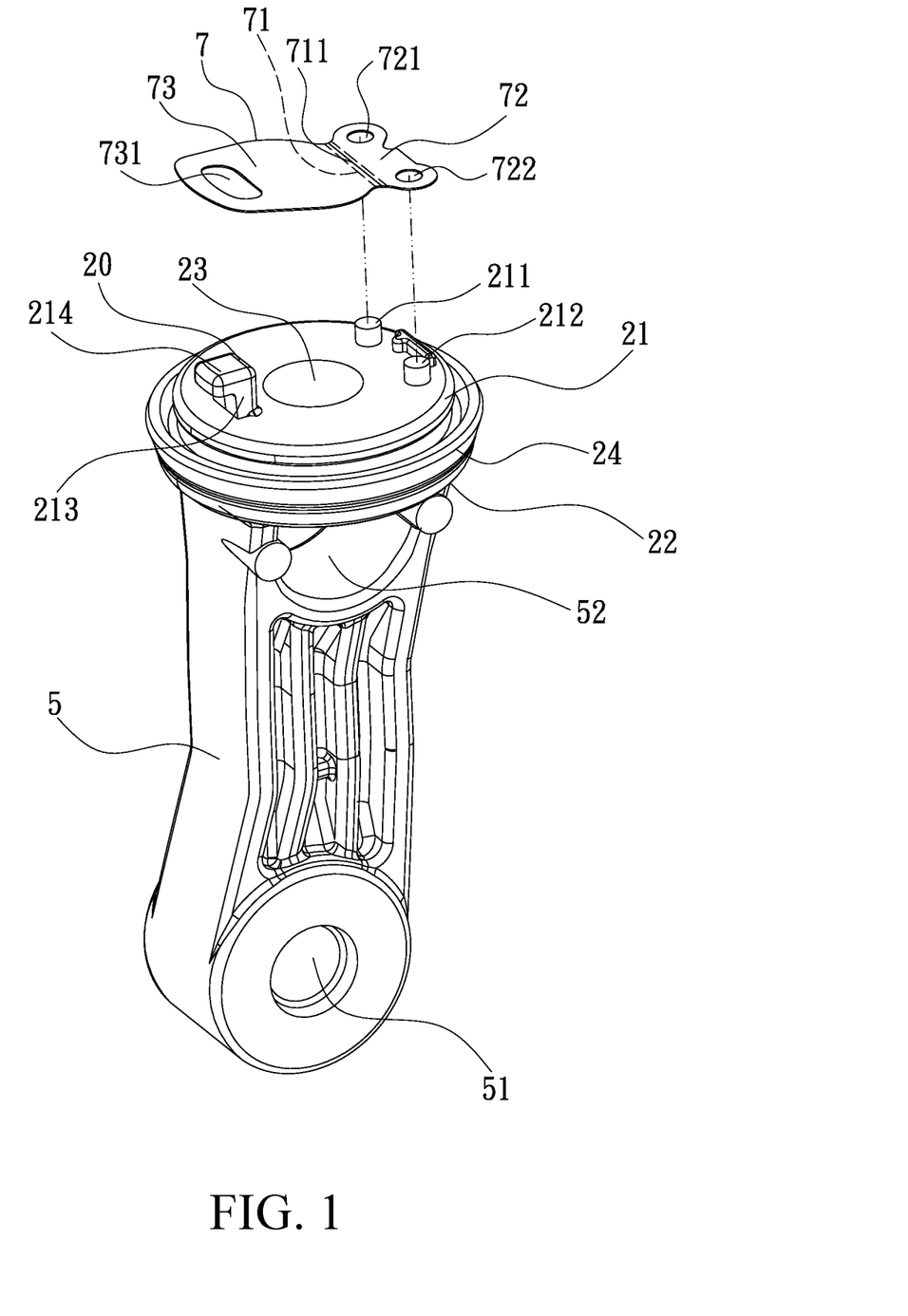
FIG. 1 is a perspective view showing the exploded components of a piston of an air compressor according to a first embodiment of the present invention.
Figure 2:
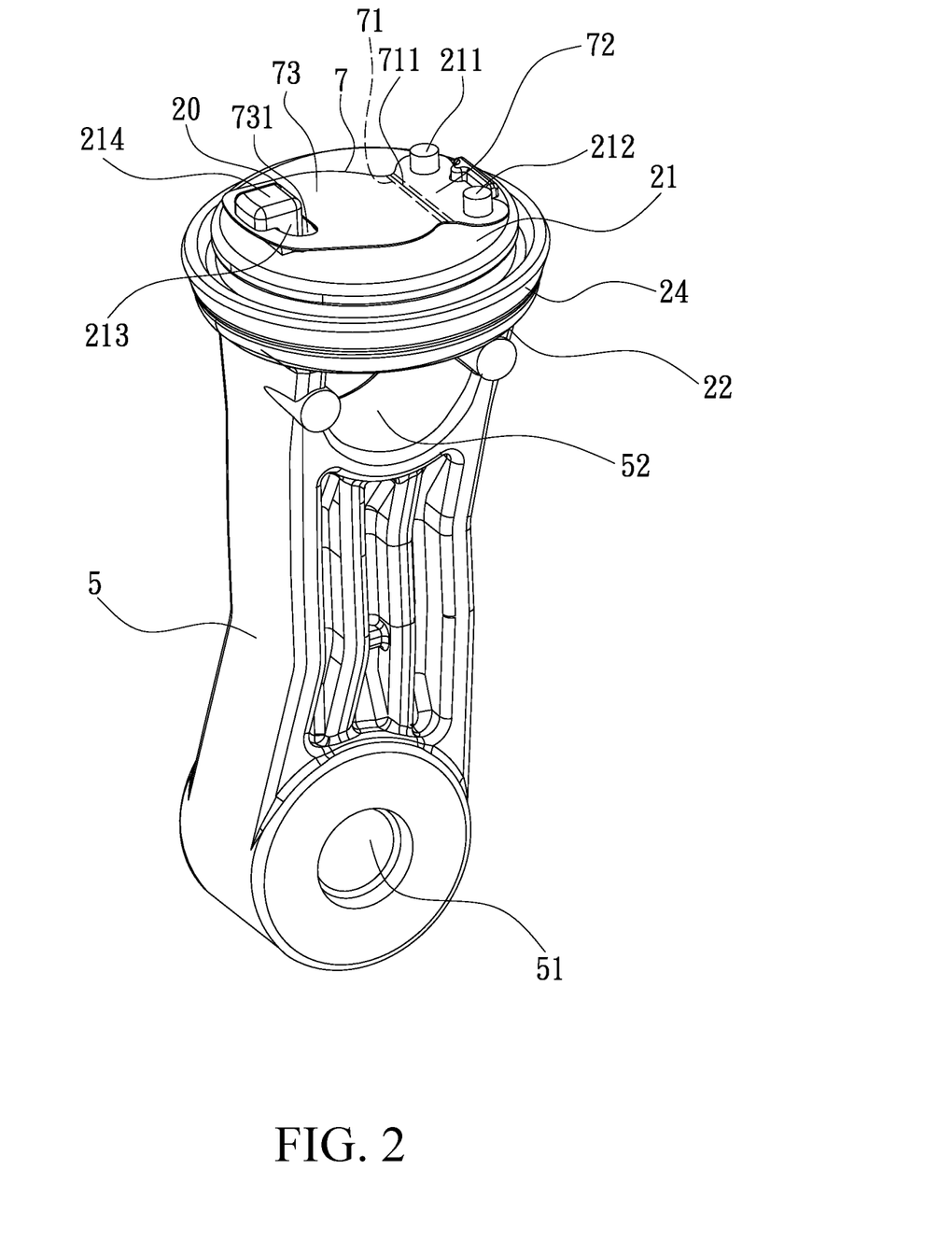
FIG. 2 is a perspective view showing the assembly of the piston of the air compressor according to the first embodiment of the present invention.
Figure 3:
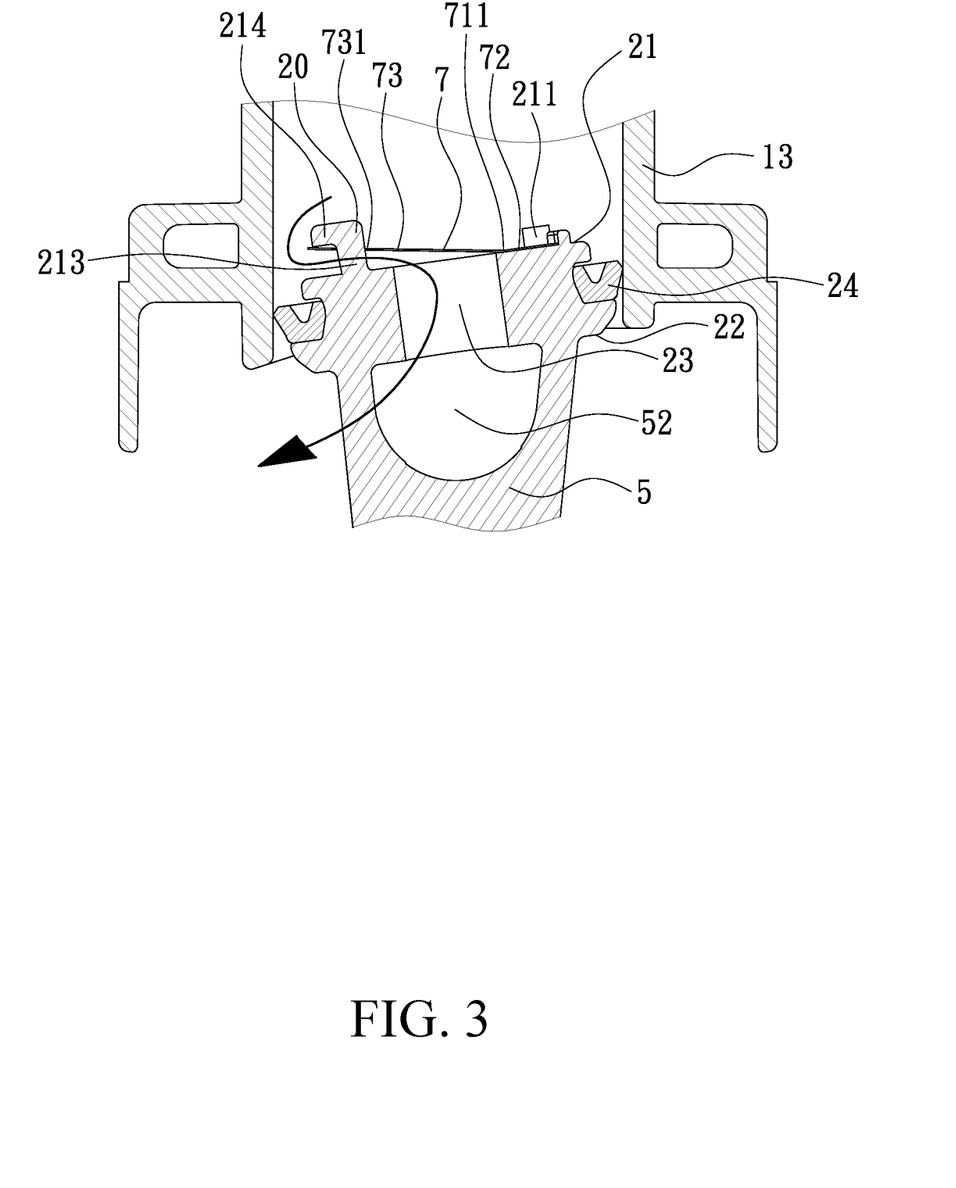
FIG. 3 is a cross sectional view showing the assembly of a part of the air compressor according to the first embodiment of the present invention.
Figure 4:
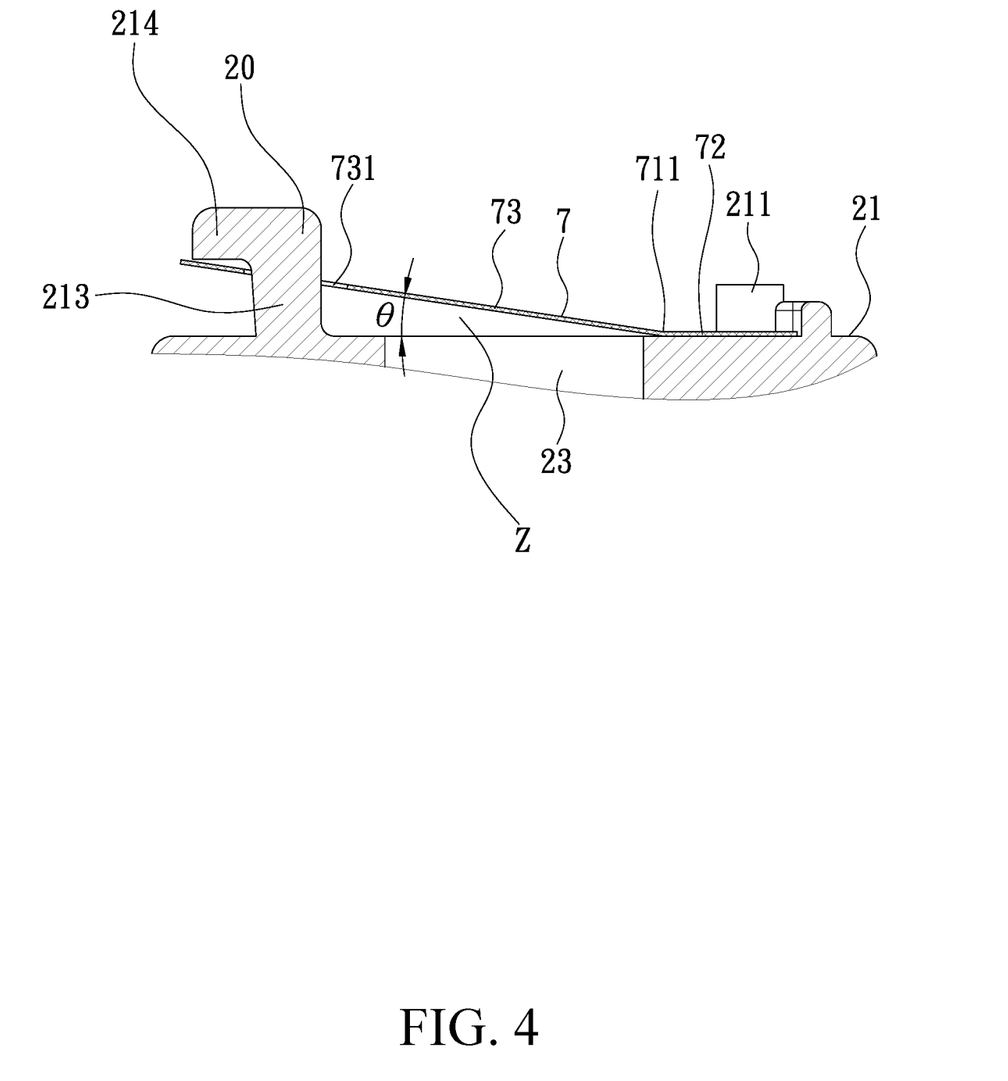
FIG. 4 is an amplified cross sectional view showing the assembly of a part of the piston of the air compressor according to the first embodiment of the present invention.
Figure 5:
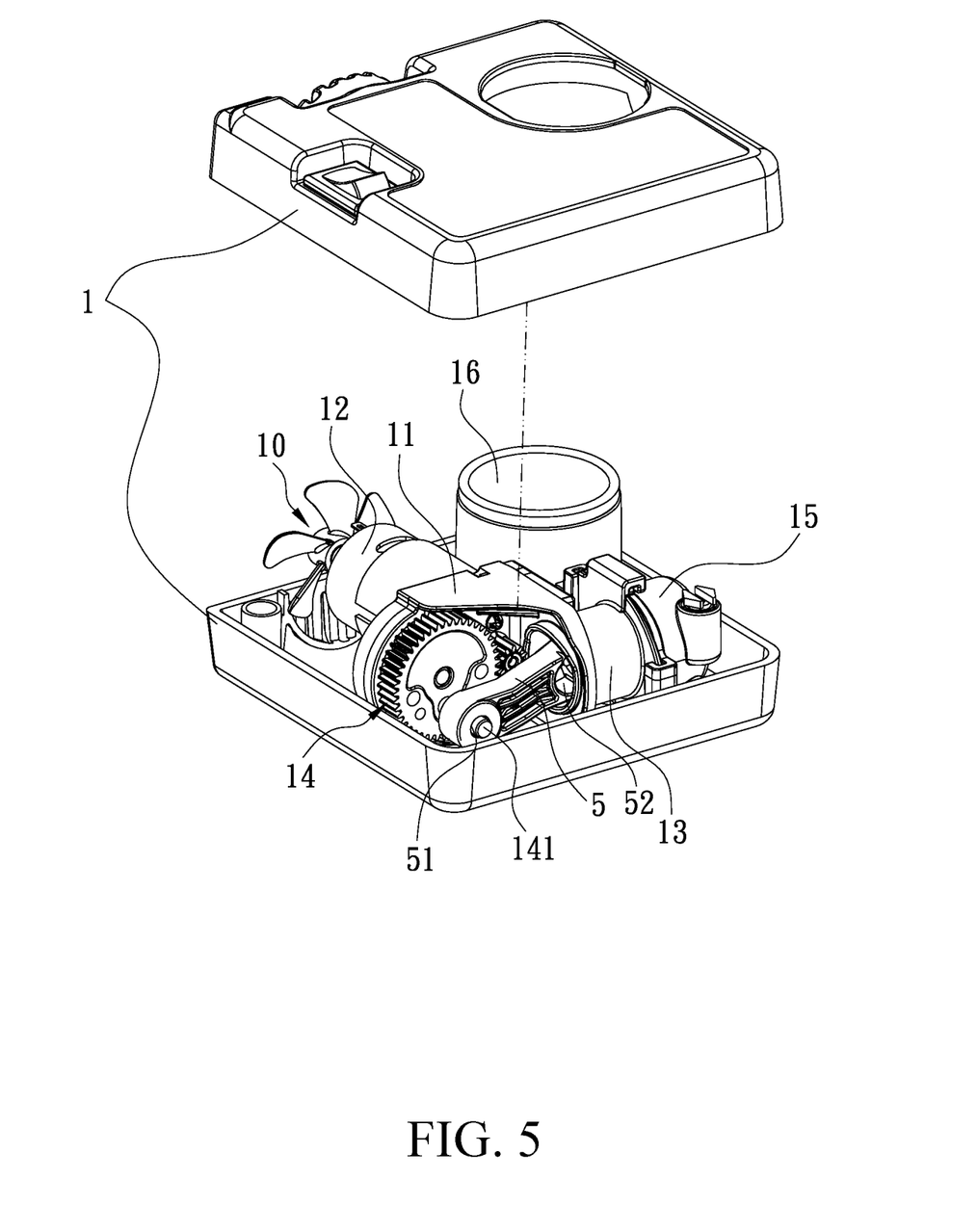
FIG. 5 is a perspective view showing the exploded components of the air compressor according to the first embodiment of the present invention.

With reference to FIG. 5, an air compressor 10 according to a first embodiment of the present invention is received in an accommodation chamber, a box 1 or other a work place. In this embodiment, as shown in FIG. 5, the box 1 receives the air compressor 10 configured to inflate airs or to connect with a sealant supply (not shown), thus inflating the airs and supplying sealant. The air compressor 10 includes a substrate 11 configured to fix a motor 12, a cylinder 13 connected on the substrate 11, a transmission mechanism 14 mounted on the substrate 11 and connected with a piston. Referring to FIGS. 1 to 6, the piston includes a top support plane 21, a bottom support disc 22, an airtight ring 24 contacting with the top support plane 21 and the bottom support disc 22 and closing the piston and the cylinder 13, and an air channel 23 communicating with the top support plane 21 and the bottom support disc 22. The bottom support disc 22 includes a piston rod 5 extending downward, and the piston rod 5 has a connection orifice 51 defined on a bottom thereof and rotatably connected with a crankshaft 141 of the transmission mechanism 14, a conduit 52 defined on a top thereof and communicating with the air channel 23. When an output shaft of the motor 12 actuates the crankshaft 141 of the transmission mechanism 14 to rotate and the piston to move upward and downward in the cylinder 13, the airs are compressed to produce compressed airs, and the compressed airs flow into a storage holder 15 so as to be supplied into a pressure gauge 16 via a delivery pipe, thus displaying a pressure value. Thereafter, the compressed airs are inflated into a deflated object (not shown) via an air hose. Alternatively, the compressed airs and sealant are supplied to a broken tire (not shown) via the air hose or a valve. Since it is well-known art, further remarks are omitted.

Figure 6:
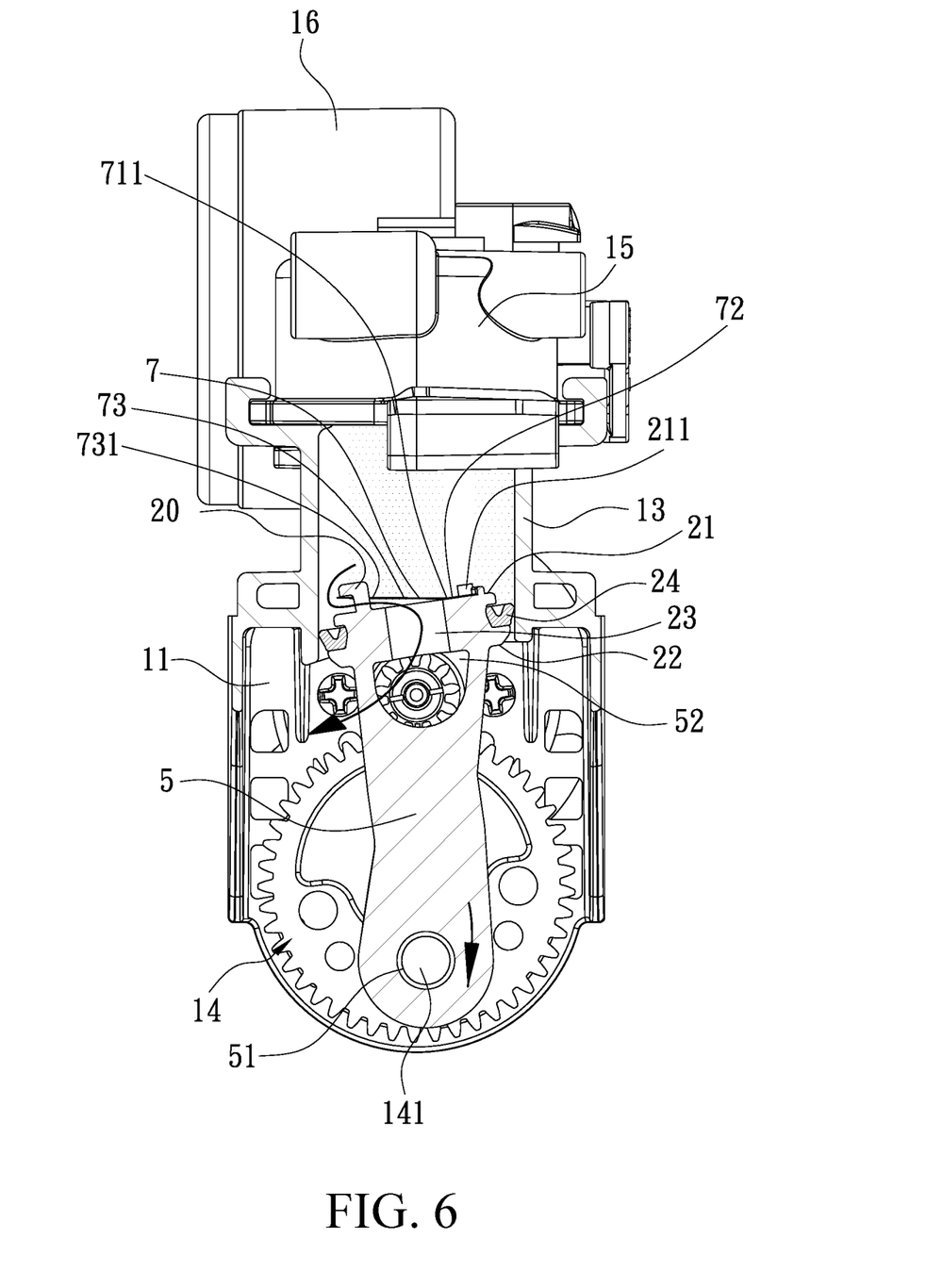
FIG. 6 is a cross sectional view showing the operation of the piston of the air compressor according to the first embodiment of the present invention.
Figure 7:
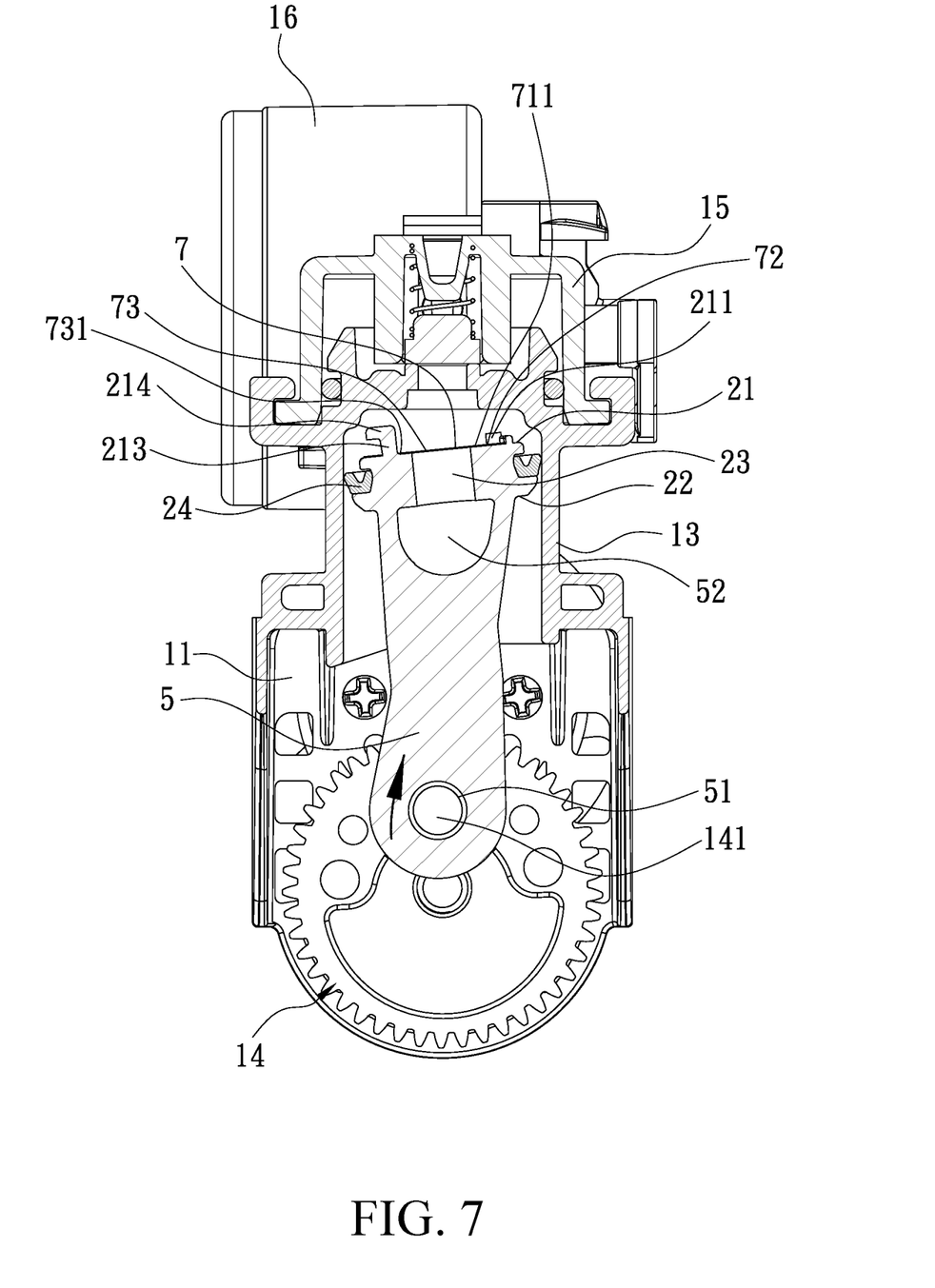
FIG. 7 is another cross sectional view showing the operation of the piston of the air compressor according to the first embodiment of the present invention.
Figure 8:
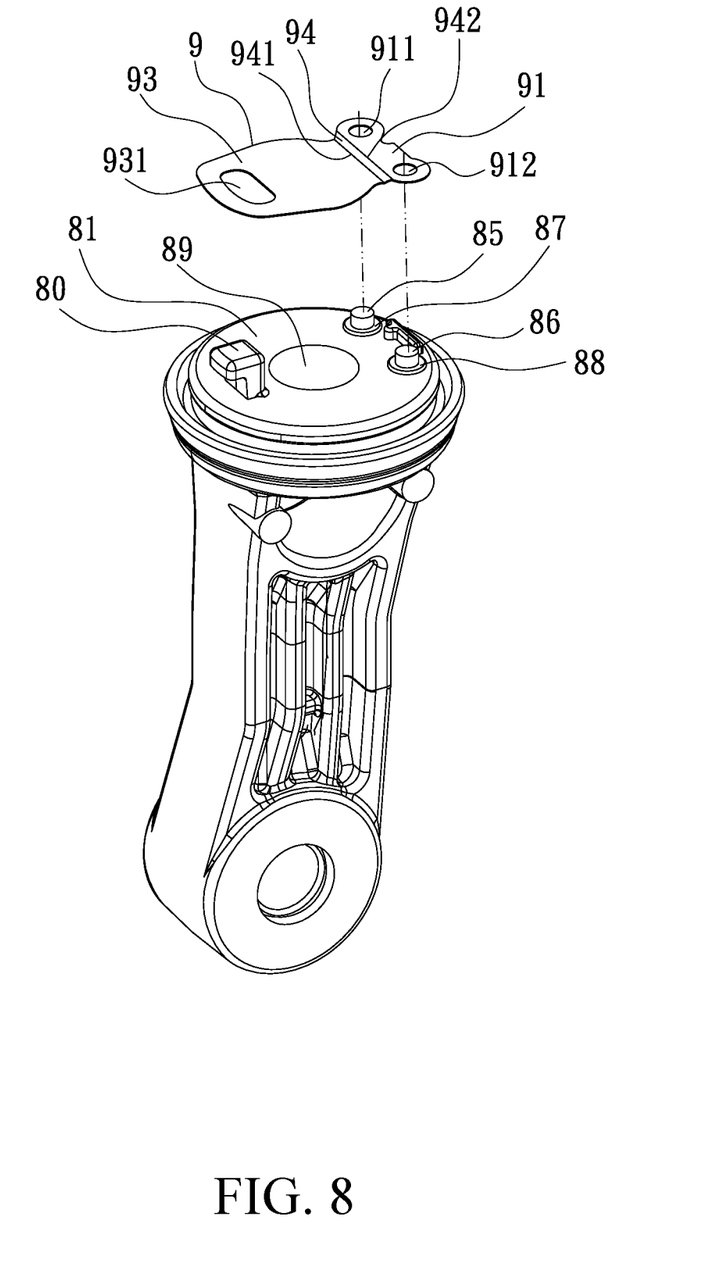
FIG. 8 is a perspective view showing the exploded components of a piston of an air compressor according to a second embodiment of the present invention.
Figure 9:
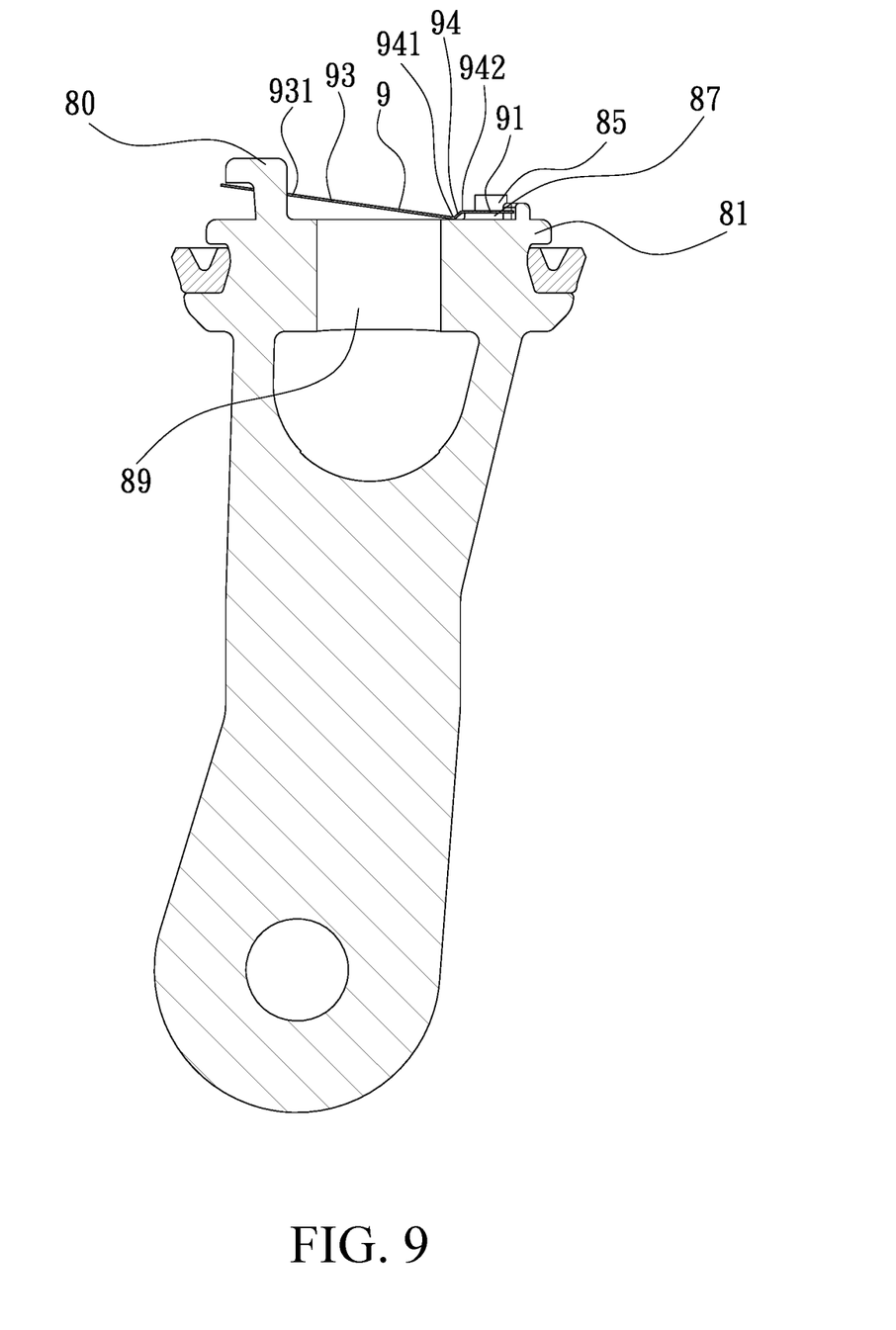
FIG. 9 is a cross sectional view showing the assembly of a piston of an air compressor according to the second embodiment of the present invention.
Figure 10:
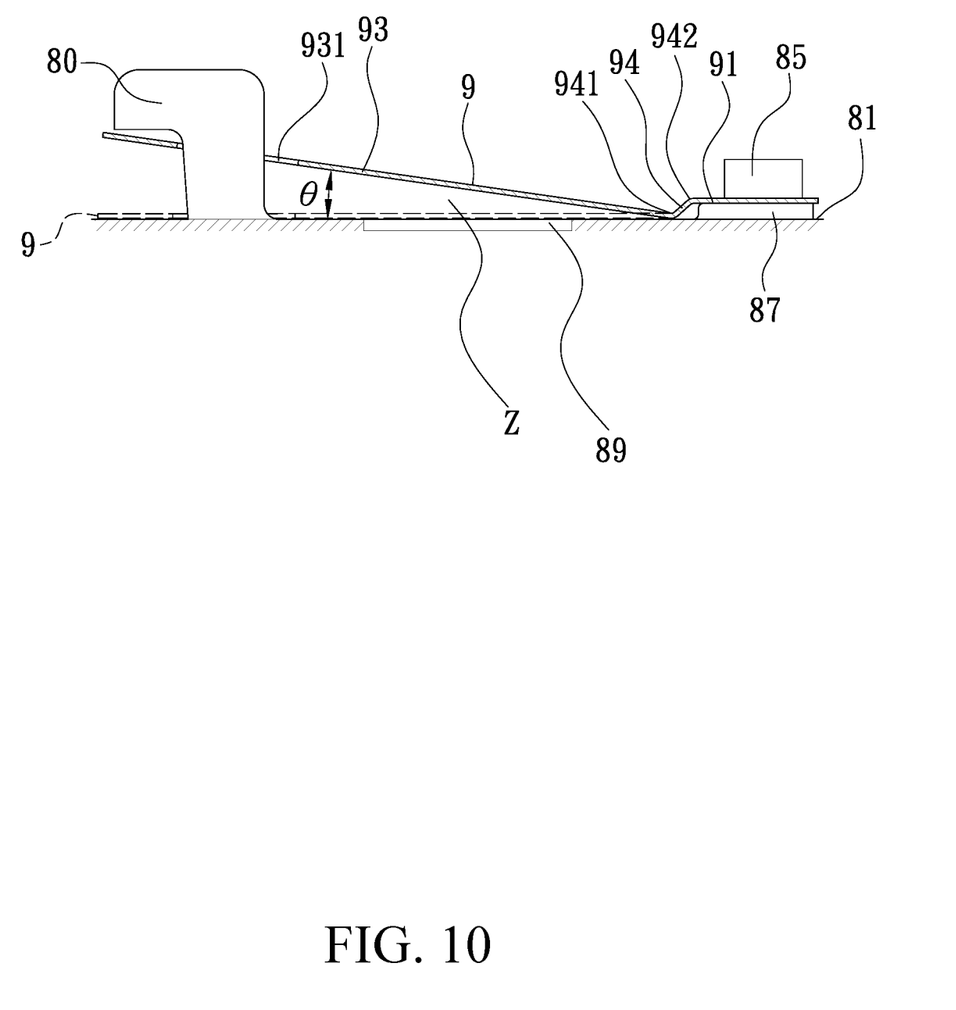
FIG. 10 is an amplified cross sectional view showing the assembly of a part of the piston of the air compressor according to the second embodiment of the present invention.
Figure 11:
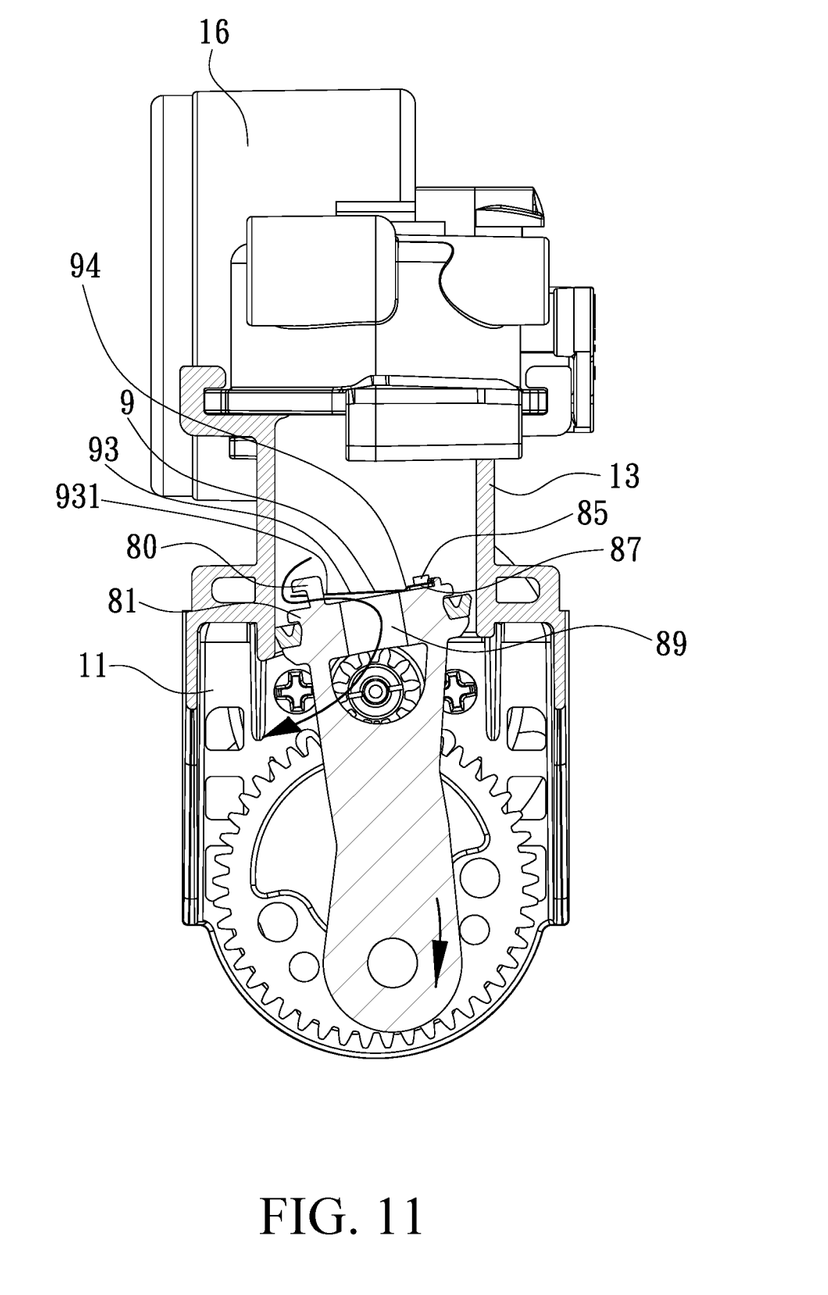
FIG. 11 is a cross sectional view showing the operation of the piston of the air compressor according to the second embodiment of the present invention.
Figure 12:
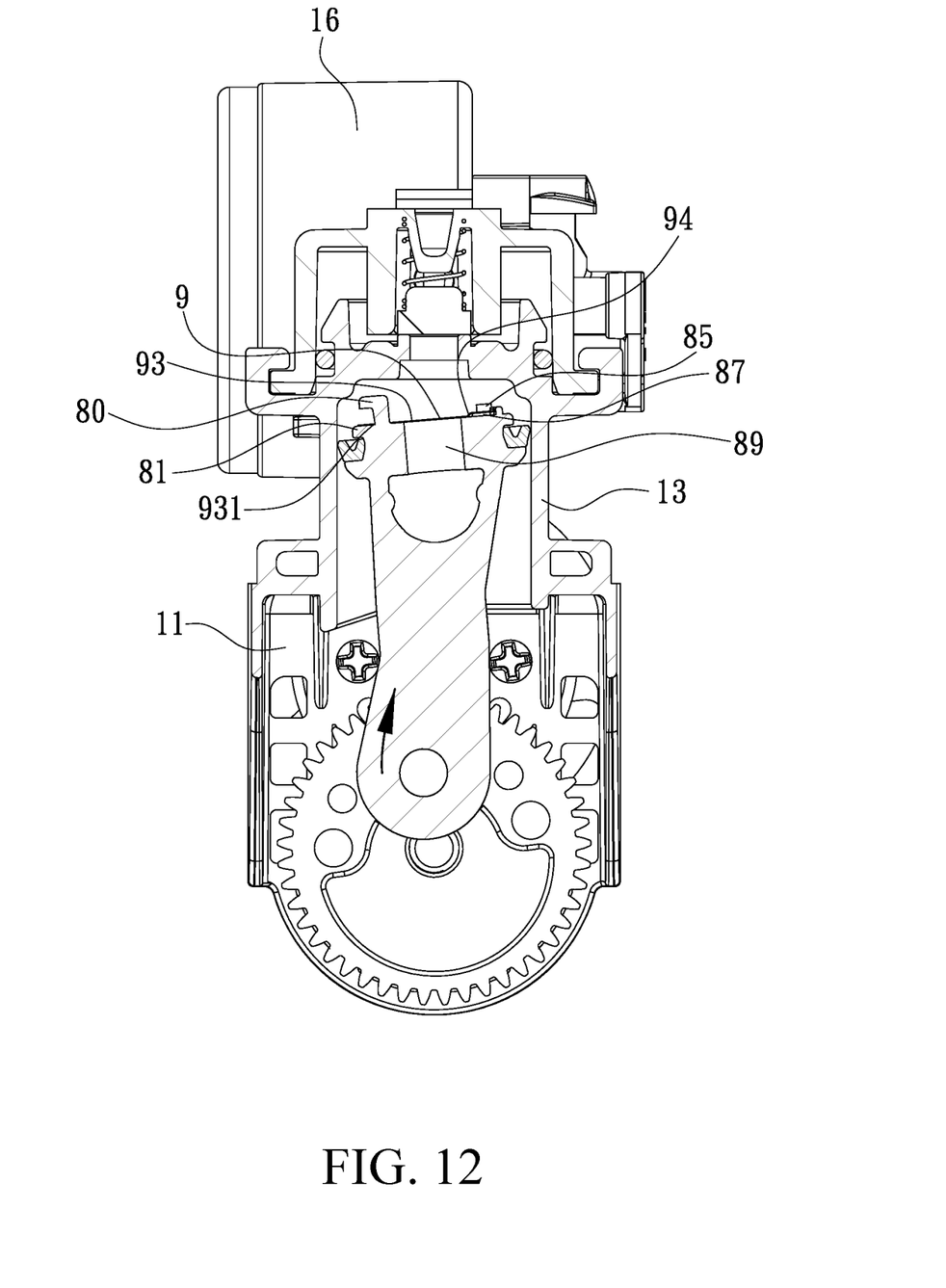
FIG. 12 is another cross sectional view showing the operation of the piston of the air compressor according to the second embodiment of the present invention.

The top support plate 21 of the piston includes an air stop sheet 7 mounted thereon and having a bending section 71, and the bending section 71 of the air stop sheet 7 has at least one collapsible guide line 711, wherein multiple collapsible guide lines 711 are formed on the bending section 71 to match with an output power of the air compressor, wherein the air stop sheet 7 is bent at a bending angle to produce the at least one collapsible guide line 711 so that when an external pressure forces the air stop sheet 7, the air stop sheet 7 is turned on/off along the at least one collapsible guide line (or track) 711, and the at least one collapsible guide line 711 has a positioning zone 72 arranged on the top support plate 21, wherein the top support plate 21 includes two separated bolts 211, 212, and the positioning zone 72 of the air stop sheet 7 has two spaced orifices 721, 722 configured to accommodate the two separated bolts 211, 212, thus fixing the air stop sheet 7 on the top support plate 21. The at least one collapsible guide line 711 of the air stop sheet 7 has an acting zone 73 opposite to the positioning zone 72 of the air stop sheet 7, wherein the acting zone 73 covers the air channel 23 of the piston, and the at least one collapsible guide line 711 is a boundary axis of the acting area 73 and the positioning zone 72 of the air stop sheet 7 so that a positive surface of the air stop sheet 7 (i.e. a top of the air stop sheet 7 facing the cylinder 13 in an upward moving stroke) forms an obtuse angle less than 180 degrees, and a back surface of the acting zone 73 of the air stop sheet 7 backing the top of the cylinder 13 turns on relative to a plane of a top of the top support plate 21 at an open angle θ, thus producing an air flowing space. Thereby, when the piston of the air compressor 10 stops, the acting zone 73 of the air stop sheet 7 turns on relative to the air channel 23 and the conduit 52 so that a pressure of the cylinder 13 balances with an atmosphere, and the piston is not stopped by an additional resistance (i.e. a back-pressure resistance) in the upward moving stroke after the air compressor 10 is opened again, as illustrated in FIGS. 6 and 7, and the piston moves in the cylinder 13 smoothly to enhance using safety and service life and to inflate the compressed airs into the deflated object easily. The acting zone 73 of the air stop sheet 7 has a passing orifice 731, and the top support plate 21 has a hook 20 configured to engage with the passing orifice 731, wherein the hook 20 has a vertical post 213 and a horizontal post 214, when the piston moves in the upward moving stroke, the acting zone 73 of the air stop sheet 7 contacts with the plane of the top of the top support plate 21 so that the air stop sheet 7 closes the air channel 23; when the piston moves in a downward moving stroke, the air stop sheet 7 is pushed by external airs to expand but is limited by the horizontal post 214 of the hook 20, thus avoiding fatigue of the air stop sheet 7. A length of the vertical post 213 of the hook 20 matches with the output power of the air compressor to comply with amplitude of the air stop sheet 7. When the piston stops, the open angle θ and an air flowing space Z produces between the acting zone 73 of the air stop sheet 7 and the plane of the top of the top support plate 21, wherein the passing orifice 731 of the air stop sheet 7 is stopped by the horizontal post 214 of the hook 20. The vertical post of the hook 20 is configured to turn on/off, expand, and retract the air stop sheet 7, so a length (i.e. a height) of the vertical post 213 is determined based on the output power of the air compressor to match with a moving path of the air stop sheet 7, and the horizontal post 214 is configured to adjust a height of the air stop sheet 7.

The air stop sheet 7 includes a bending section 71 on which the at least one collapsible guide line 711 are formed so that the open angle θ is defined between the acting zone 73 of the air stop sheet 7 and the plane of the top of the top support plate 21. Preferably, a size and a hardness of the air stop sheet 7 are determined based on the output power of the air compressor. To comply with a large output power of the air compressor, the amplitude of the air stop sheet has to be increased by forming a bending section 94 on which a first collapsible guide line 941 and a second collapsible guide line 942 are formed. Referring to FIGS. 8-12, the air stop sheet 9 has a positioning zone 91, and the positioning zone 91 of the air stop sheet 9 has two spaced orifices 911, 912. The air stop sheet 9 further has an acting zone 93 opposite to the positioning zone 91 of the air stop sheet 9, wherein the acting zone 93 of the air stop sheet 9 has a passing orifice 931, the top support plate 81 has a hook 80 configured to engage with the passing orifice 931, such that when the piston moves in the upward moving stroke, the acting zone 93 of the air stop sheet 9 contacts with the plane of the top of the top support plate 81 so that the air stop sheet 9 closes an air channel 89 of the piston; when the piston moves in a downward moving stroke, the air stop sheet 9 is pushed by external airs to expand but is limited by the hook 80, thus avoiding fatigue of the air stop sheet 9. The bending section 94 is defined between the positioning zone 91 and the acting zone 93, wherein the bending section 94 has the first collapsible guide line 941 and the second collapsible guide line 942 formed thereon, and the two spaced orifices 911, 912 of the positioning zone 91 pass through two separated extensions 85, 86 of a plane of a top of the top support plate 81 and are stopped by two spaced circular shoulders 87, 88, such that when the air compressor operates in the large output power, the first collapsible guide line abuts against the plane of the top of the top support plate 81, and an open angle θ produces between the acting zone 93 of the air stop sheet 9 and the plane of the top of the top support plate 81. Thereby, when the air compressor 10 stops, the acting zone 93 of the air stop sheet 9 turns on relative to the air channel 89 so that a pressure of the cylinder 13 balances with atmosphere, and the piston is not stopped by an additional resistance (i.e. a back-pressure resistance) in the upward moving stroke after the air compressor 10 is opened again, hence the piston moves in the cylinder 13 smoothly to enhance using safety and service life and to inflate the compressed airs into the deflated object easily. Preferably, the air stop sheet 9 has the bending section 94 to be turned on/off, expanded, and retracted smoothly, thus enhancing the service life.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. An air compressor comprising a piston which is actuated by a motor to move upward and downward in a cylinder;

wherein the piston of the air compressor includes an air stop sheet mounted on a top support plate thereof, and the air stop sheet has a bending section, wherein the bending section has a positioning zone arranged on the top support plate, and the bending section further has an acting zone located opposite to the positioning zone and configured to cover an air channel of the piston;

wherein the bending section is a boundary axis of the acting area and the positioning zone of the air stop sheet so that an obtuse angle less than 180 degrees is formed between a top of the air stop sheet facing the cylinder and the top support plate, and a back surface of the acting zone of the air stop sheet facing away from a top of the cylinder is lifted relative to a top plane of the top support plate at an open angle θ, thus producing an air flowing space;

wherein a plurality of collapsible guide lines are formed on the bending section, the bending section includes a first collapsible guide line and a second collapsible guide line formed thereon, the acting zone has a passing orifice, the top support plate has a hook configured to engage with the passing orifice, when the air compressor stops, the acting zone of the air stop sheet is lifted relative to the top plane of the top support plate, and the passing orifice of the air stop sheet is stopped by of the hook.

2. The air compressor as claimed in claim 1, wherein the top support plate includes two separated bolts, and the positioning zone of the air stop sheet has two spaced orifices configured to accommodate the two separated bolts, thus fixing the air stop sheet on the top support plate; and when the piston of the air compressor stops, the acting zone opens the air channel of the top support plate of the piston.

3. The air compressor as claimed in claim 2, wherein the hook of the top support plate has a vertical post and a horizontal post, wherein a length/a height of the vertical post is determined based on an output power of the air compressor to match a moving path of the air stop sheet, and a length of the horizontal post is configured to be changed to adjust a height of the air stop sheet.

4. The air compressor as claimed in claim 2, wherein the two spaced orifices, of the positioning zone pass through two separated extensions of a plane of a top of the top support plate and are stopped by two spaced circular shoulders.

\* \* \* \* \*